W. R. LUCY.
TRACE COUPLING.
APPLICATION FILED OCT. 9, 1911.
1,021,319.
Patented Mar. 26, 1912.
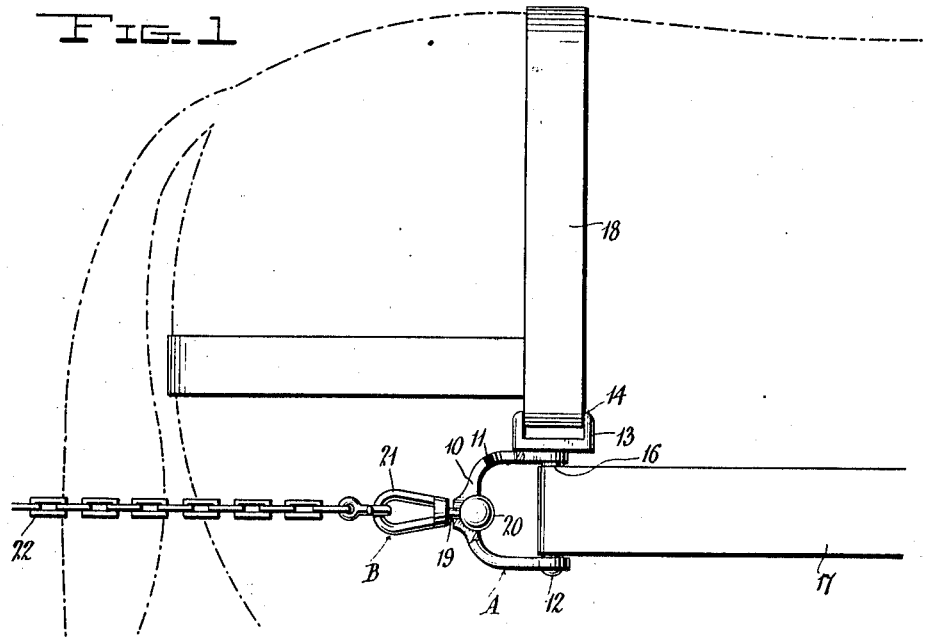
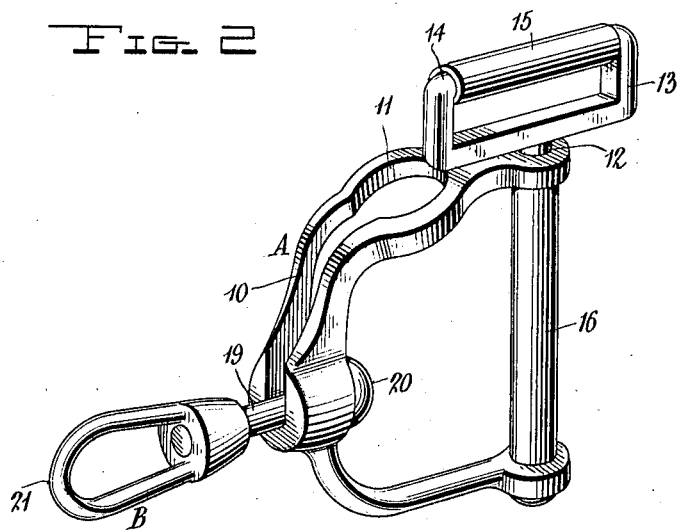
Witnesses
Inventor
W. R. Lucy,
By 
Attorneys
COLUMBIA PLANOGRAPH CO., WASHINGTON, D. C.

UNITED STATES PATENT OFFICE.

WILLIAM R. LUCY, OF RALSTON, WASHINGTON.

TRACE-COUPLING.

1,021,319.  Specification of Letters Patent.  Patented Mar. 26, 1912.

Application filed October 9, 1911. Serial No. 653,640.

*To all whom it may concern:*

Be it known that I, WILLIAM R. LUCY, a citizen of the United States, residing at Ralston, in the county of Adams, State of Washington, have invented certain new and useful Improvements in Trace-Couplings; and I do hereby declare the following to be a full, clear, and exact description of the invention, such as will enable others skilled in the art to which it appertains to make and use the same.

This invention relates to trace couplings.

The object of the invention resides in the provision of a trace coupling one portion of which is secured to the trace and hip strap of a harness and the other portion to the free end of the butt chain which is carried at the terminal of the swingle-tree, said coupling being so constructed and arranged that the butt chain can be easily and quickly connected to the trace and when so connected may be locked against accidental disconnection therefrom.

A further object of the invention resides in the provision of a trace coupling in which the use of hooked elements is entirely dispensed with so that the danger of the harness of the draft animal catching upon protruding objects is entirely obviated.

With the above and other objects in view, the invention consists in the details of construction and in the arrangement and combination of parts to be hereinafter more fully described and particularly pointed out in the appended claims.

In describing the invention in detail, reference will be had to the accompanying drawings, wherein like characters of reference denote corresponding parts in the several views, and in which—

Figure 1 is a side elevation of the coupling showing same applied to secure a trace to a butt chain, and Fig. 2, a detail perspective view of the coupling.

Referring to the drawings the coupling is shown as comprising a pair of detachable interlocking members A and B the former of which is directly secured to the rear end of the harness trace, while the latter is carried at the free end of the butt chain which is attached to the swingle-tree. The member A of the coupling is of U-shape and provided with a slot 10 extending partly through its bight portion and partly through an adjacent arm. The portion of the member A surrounding the slot 10 is relatively wider than the remaining portions thereof and the end of said slot which is disposed in one of the arms of the U-shape member A terminates in an enlarged portion 11. Rotatably mounted between the free end of the arms of the member A is a shaft 12 which has the end thereof adjacent the arm in which the slot 10 is disposed provided with a loop member 13 adapted to partly overlie the enlarged end 11 of the slot 10 when the shaft 12 has been rotated to a given position. The outer side of the loop member 13 is indicated at 14 and upon said side is rotatably mounted a sleeve 15. Likewise another sleeve 16 is rotatably mounted upon the shaft 12 between the arms of the section A. Attached to the section A around the sleeve 16 is the inner end of a trace 17 while one end of a hip strap 18 is attached around the sleeve 15, said sleeves 15 and 16 serving to eliminate wear of the hip strap 18 and trace 17 respectively during use.

The section B of the coupling comprises a stem 19 of the necessary diameter to freely slide in the smallest portion of the slot 10 of the member A. One end of the stem 19 terminates in a ball while the other end thereof has swiveled thereon a link 21 to which is attached the free end of a butt chain 22. It will be noted that the ball 20 is of a greater diameter than the smallest portion of the slot 10 but will pass freely through the enlarged portion 11 of said slot.

In order to articulate the sections of the coupling the shaft 12 is rotated so as to dispose the loop member 13 at right angles to the adjacent arm of the section A and thus remove said loop member from overlying relation with respect to the enlarged portion 11 of the slot 10. The ball 20 of the section B is then inserted through the enlarged portion 11 of the slot 10 and the stem 19 moved through said slot to the opposite end of the latter and when in this position the ball 20 will prevent disengagement of the sections of the coupling as will be apparent. In order to provide against the disengagement of the sections of the coupling should the section B accidentally move to the enlarged end 11 of the slot 10 the shaft 12 is rotated so that the loop member 13 will partially overlie the enlarged portion 11 of said slot and thus serve as a keeper to prevent the passage of the ball 20 through said enlarged portion 11. To disengage the sections A and B it is only necessary to rotate the shaft 12 so that the loop member 13 will not overlie the enlarged portion 11 of the slot 10 when the section B can be moved in said slot to a position that will permit the passage of the ball 20 through the enlarged portion 11 of the slot 10.

What is claimed is:

1. A coupling comprising a pair of detachably interlocking sections, one of said sections consisting of a U-shaped member including a bight portion and spaced arms and having a slot therein extending partially through the bight portion and one of the arms of said member, said slot having the end thereof enlarged which is disposed in the arm of the member, a shaft rotatably mounted between the free ends of the arms of the member and having one terminal provided with a loop portion adapted to partially overlie the enlarged end of the slot, and the other member of the coupling comprising a stem slidable in the slot of the first named member and having one end terminating in a ball adapted to pass through the enlarged end of the slot and locked against such passage when the loop portion of the shaft of the first named member is positioned to partially overlie the enlarged end of the slot and a link swiveled on the other end of said stem.

2. A coupling comprising a pair of detachably interlocking sections, one of said sections consisting of a U-shaped member including a bight portion and spaced arms and having a slot therein extending partially through the bight portion, and one of the arms of said member, said slot having the end thereof enlarged which is disposed in the arm of the member, a bar mounted between the free ends of the arms of the said member, the other member of the coupling comprising a stem slidable in the slot of the first named member and having one end terminating in a ball adapted to pass through the enlarged end of the slot, means for locking the ball end of the stem against passage through the enlarged end of the slot, and a link swiveled on the other end of said stem.

In testimony whereof, I affix my signature, in presence of two witnesses.

WILLIAM R. LUCY.

Witnesses:
I. N. McCollom,
Harry Grimes.

---

Copies of this patent may be obtained for five cents each, by addressing the "Commissioner of Patents, Washington, D. C."